United States Patent [19]
Fern et al.

[11] 3,910,809
[45] Oct. 7, 1975

[54] APPARATUS FOR PRODUCING INTERLAYERS FOR ANTENNA-TYPE WINDSHIELDS

[75] Inventors: Robert W. Fern; Robert J. Bobel, II, both of Toledo, Ohio

[73] Assignee: Libbey-Owens-Ford Company, Toledo, Ohio

[22] Filed: Feb. 19, 1974

[21] Appl. No.: 443,479

[52] U.S. Cl. ............... 156/433; 156/556; 343/713
[51] Int. Cl.² ..................... B31F 5/00; H01Q 1/32
[58] Field of Search ............ 156/99, 106, 433, 556; 343/711, 713

[56] References Cited
UNITED STATES PATENTS

| | | | |
|---|---|---|---|
| 3,579,243 | 5/1971 | Dickason | 343/713 |
| 3,638,225 | 1/1972 | Zawodniak | 343/713 |
| 3,673,044 | 6/1972 | Miller | 156/433 |
| 3,680,132 | 7/1972 | Tolliver | 343/713 |

*Primary Examiner*—Douglas J. Drummond
*Attorney, Agent, or Firm*—Collins, Oberlin & Darr

[57] ABSTRACT

An apparatus for preparing plastic sheets, to be utilized as interlayers in laminated antenna-windshield structures, comprising a tab laying mechanism for feeding and depositing a single connecting tab on wire elements embedded in the plastic sheet in a predetermined pattern. The tab laying mechanism, operative in conjunction with a wire laying device, places a single tab on closely spaced adjacent portions of the wire elements in a precise orientation relative to the same for subsequent attachment thereto.

14 Claims, 9 Drawing Figures

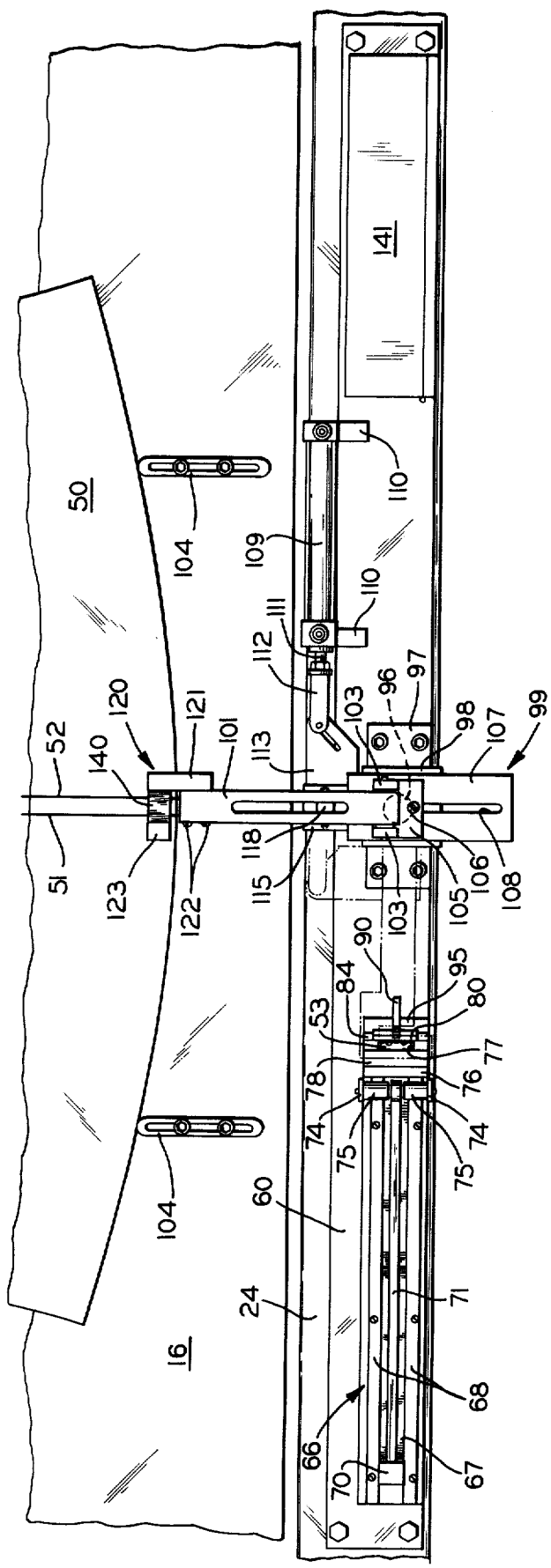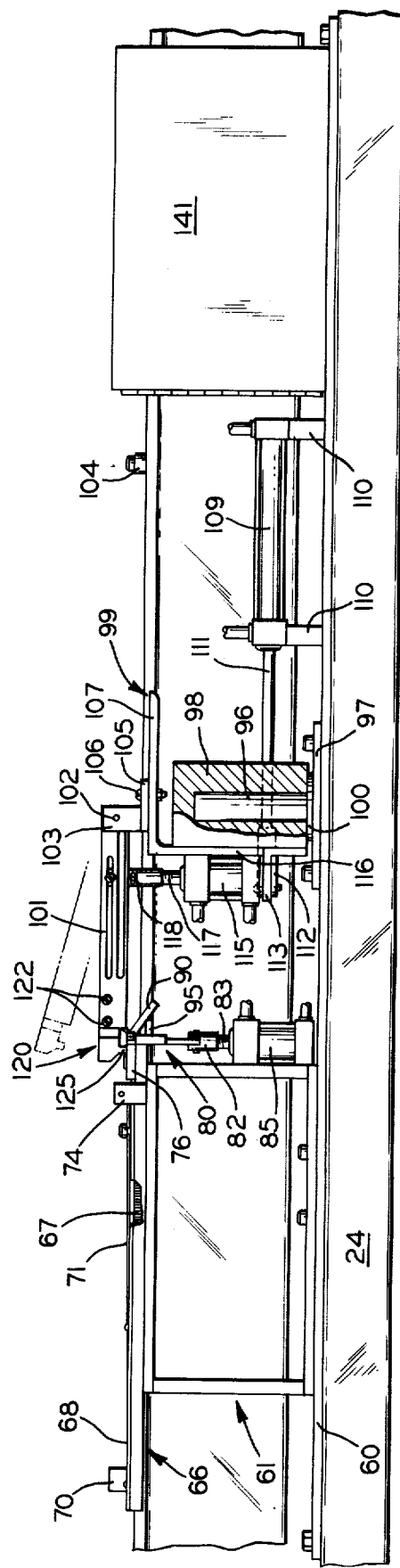

APPARATUS FOR PRODUCING INTERLAYERS FOR ANTENNA-TYPE WINDSHIELDS

BACKGROUND OF THE INVENTION

1. Field of the Invention

The present invention relates generally to the manufacture of laminated glass windshields with built-in antennas and, more particularly, to an apparatus for positioning a connecting tab on the wire elements forming the windshield antenna.

2. Description of the Prior Art

The use of built-in antennas as an integral part of windshields have become increasingly popular in recent years, replacing the familiar flexible, telescoping rod-type antennas which were mounted exteriorly of an automobile adjacent the right front fender thereof and were extremely susceptible to breakage and pilferage. Generally, in perhaps their most popular form, these built-in antennas are formed of two substantially inverted "L" shaped lengths of wire which are positioned back-to-back and embedded in the plastic interlayer of an otherwise conventional laminated glass windshield. This form of antenna gives adequate radio reception and, at the same time, is optically acceptable in a windshield because it does not materially affect the appearance or obstruct vision therethrough.

A machine, such as that disclosed and claimed in U.S. Pat. No. 3,673,044, assigned to the same assignee as the present invention, has been designed to apply the antenna wires to and embed the same automatically in the plastic interlayers in precise patterns on successive sheets, as a large volume operation. Subsequently, the closely spaced, vertical portions of the wire elements are wrapped about and permanently secured, as by soldering, for example, to a thin metallic plate or tab to form a connection adapted to receive electrical leads for the radio antenna system.

Conventionally, the connecting metal tabs are positioned in place manually at a station remote from the wire laying operation after final lamination, i.e., after sandwiching the plastic interlayer between the inboard and outboard glass sheets. It can be appreciated that the time consuming and arduous task of placing the tabs on the antenna wires by hand increases labor and production costs. Also, this manual operation poses problems in obtaining the accuracy in uniform pattern reproduction from windshield to windshield necessary to pass the rigid inspection requirements for glazing such sight openings. Moreover, the free ends of the antenna wires, which are left dangling beyond the forward marginal edge of the plastic sheet during assembly with the inboard and outboard glass sheets, sometimes are broken, frayed or otherwise damaged during such assembly and/or during the windshield trimming and edging operations, resulting in defective and unacceptable products.

SUMMARY OF THE INVENTION

Accordingly, it is a primary object of the present invention to obviate the above-noted disadvantages by providing a new and useful apparatus for laying connecting tabs on the antenna wire portions of laminated antenna windshields rapidly, smoothly and with a precision essential to meet production requirements in the automotive field.

It is another object of this invention to combine the foregoing tab laying apparatus with a wire laying apparatus for sequential, continuous operation therewith at a single station.

It is a further object of the present invention to provide a new and useful apparatus for placing a connecting tab on the plastic interlayer in the proper orientation relative to the antenna wire elements embedded therein for subsequent attachment thereto.

In one aspect thereof, the apparatus of this invention is characterized by the provision of a tab laying apparatus operative in conjunction with a wire laying apparatus as a continuous operation thereof, for removing a single wire connecting tab from a supply of such tabs and transferring the same for precise placement on antenna wire portions previously laid and embedded in a plastic interlayer by the wire laying apparatus.

Further and more detailed objects and advantages of the invention will become apparent in the course of the following description when taken in connection with the accompanying drawings.

BRIEF DESCRIPTION OF THE DRAWINGS

In the drawings, wherein like numerals are employed to designate like parts throughout:

FIG. 4 is a top plan view of the tab laying apparatus of FIG. 3, showing the transfer arm swung 90° into a tab delivering position;

FIG. 5 is a front elevational view of the tab laying apparatus of FIG. 3, showing the transfer arm in a lowered, tab pick-up position in full lines and an elevated, tab lifting or rest position in broken lines;

DESCRIPTION OF THE PREFERRED EMBODIMENT

Figure 1:
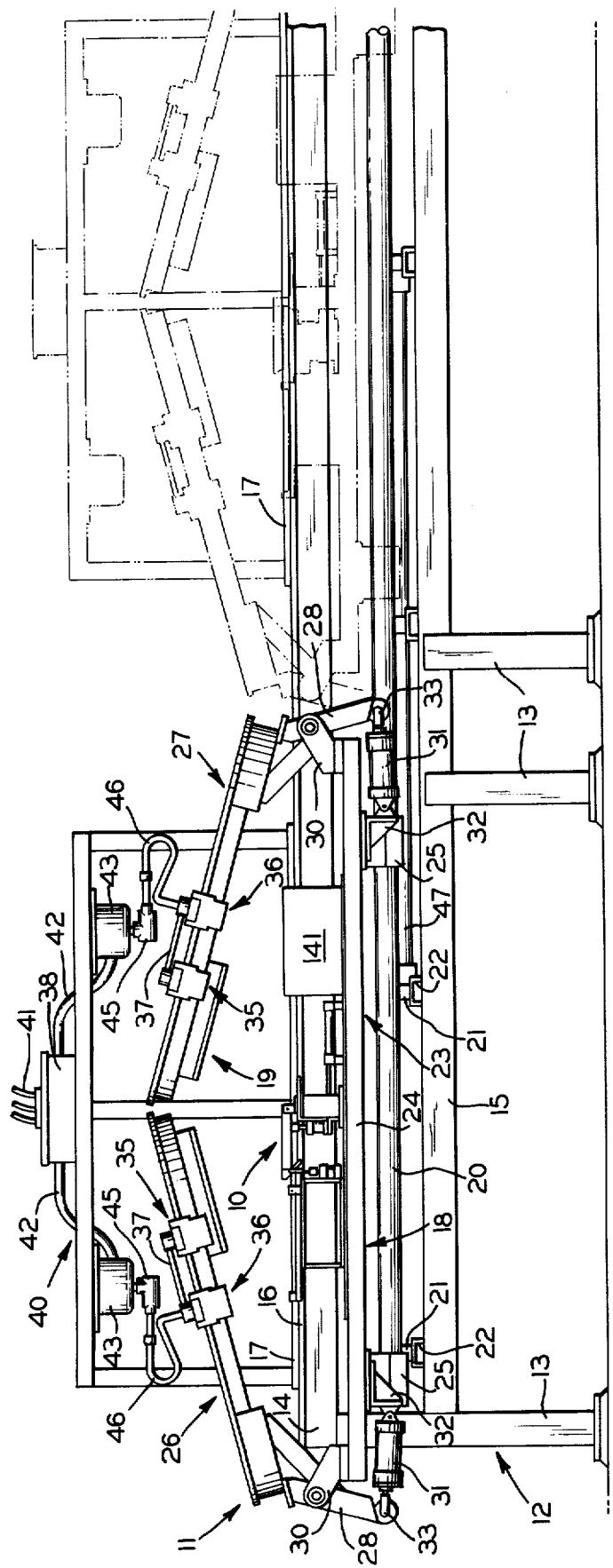
FIG. 1 is a front elevational view, from the operator's position, of a wire laying machine incorporating the tab laying apparatus constructed in accordance with this invention, showing an alternate position thereof in phantom.

Referring now in detail to the illustrative embodiment depicted in the accompanying drawings, there is shown in FIG. 1 a tab laying apparatus, generally designated 10, incorporated in an antenna wire laying apparatus, comprehensively designated 11, which comprises a frame 12 including a plurality of upstanding legs or posts 13 connected at their upper ends by external, longitudinally extending, horizontal structural members 14 and, intermediate their ends, by internal, longitudinally extending, horizontal structural members 15.

Suitable transversely extending structural or cross members (not shown) are welded or otherwise fixedly secured at their respective opposite ends to structural members 14 and 15, respectively.

In addition to supporting the tab laying apparatus 10, hereinafter described in detail, frame 12 also supports a table 16 upon which are located the templates or patterns 17 for receiving and positioning the plastic sheets into which antenna wires are embedded.

Frame 12 also supports a carriage 18, carrying the wire laying mechanism, generally designated 19, and mounted for reciprocal movement above table 16 on elongated, rod-like track or slide elements 20 extending along the opposite sides of frame 12 and supported, by brackets 21, on the ends of a series of relatively small channel members 22, which are mounted on and extend transversely of the intermediate structural members 15. The carriage 18 comprises a rectangularly shaped frame 23 made up of a plurality of hollow beam members 24 located between the upper and intermediate structural members 14 and 15 and mounted for reciprocal movement along the slide elements 20 by means of guides 25 depending from the frame beam members 24 and embracing the slide elements 20.

The wire laying mechanism 19 includes a pair of track templates 26 and 27, pivotally mounted by means of supporting bracket arms 28 between post brackets 30 extending upwardly and outwardly from the carriage 18, and swingable between the upper inoperative position of rest shown in FIG. 1 and a lower, operative position (not shown) by air cylinders 31 carried by brackets 32 depending from the carriage 18 and equipped with plungers 33 attached at their outer ends to the lower ends of the bracket arms 28. Mounted in tandem for movement on and along each of the track templates 26 and 27 are a preheating head 35 and a wire laying head 36 connected together for movement as a unit by a flexible cable 37. A junction box 38 is carried by an upstanding frame 40 and is connected to a suitable source of electrical power (not shown) by means of primary feed lines 41. Current is delivered from the junction box 38 through conductor cables 42 to distributor boxes 43, which in turn distribute the same through swivel power units 45 and cables 46 to the preheating and wire laying heads 35 and 36 associated with the track templates 26 and 27.

The carriage 18 is reciprocated between the full and broken line positions shown in FIG. 1 by means of a horizontally arranged hydraulic cylinder 47 mounted on frame 12 and having a suitable piston (not shown) movable within cylinder 47 a distance substantially corresponding to the travel of carriage 18. The cylinder piston rod can be mounted to carriage 18 by any suitable means, such as a cable pulley arrangement, also not shown, for example. Thus, the wire laying mechanism 19 is reciprocated back and forth over the table 16 above the spaced patterns 17 to permit the replacement of a completed wired plastic interlayer by an unwired plastic interlayer on the pattern 17 at one end of table 16 while wire antenna elements are being incorporated in still another plastic interlayer disposed on the pattern 17 at the other end of table 16.

In operation, a sheet of plastic 50 (FIG. 2) is placed on the pattern 17 at one end of table 16 and located so that the edges of the plastic sheet 50 coincide with the edges of the pattern platform. The wire laying mechanism 19 is then moved to the position shown in full lines in FIG. 1, to bring it over such pattern 17, and then operated to incorporate wire antenna elements 51 and 52 into the plastic sheet 50. While this is being done, another plastic sheet 50 will be located on the pattern platform 17 at the other end of table 16 and, upon completion of the wire laying cycle over the first pattern 17, the wire laying mechanism 19 will be moved to the broken line position over the second pattern 17. Then the plastic sheet 50 on the first pattern platform, with the wire elements 51 and 52 incorporated therein, can be removed and a new sheet of plastic located on such first pattern 17 while the mechanism 19 is embedding the antenna wires in the sheet of plastic on the second pattern 17 at the other end of table 16.

The actual laying of the wire elements 51 and 52 on and the embedding of them into a plastic interlayer 50 on one of the pattern platforms 17, when the mechanism 19 is positioned thereabove, is done by the heads 35 and 36 during travel along the track templates 26 and 27 at a time or times when the templates are in their lowered positions substantially parallel to the sheet 50.

The heads 35 and 36 are connected together for movement in tandem as a unit along the associated template. However, in order to produce the antenna wire pattern shown in FIG. 2, whereby the vertical legs 51a and 52a of the pattern are in close proximity, the track templates 26 and 27 must be so located relative to one another that only one of them can be in its lowered or operative position at a time. Accordingly, with track template 26 lowered, and the motors of the respective heads 35 and 36 energized, the heads will advance along the template 26. As the heads 35 and 36 move onto and over the plastic sheet 50, the preheating head 35 heats and softens the surface of the plastic sheet 50 along a path in advance of the head 36, which lays a length of wire onto the heated path and presses the same into the heated plastic sheet 50. Means (not shown) are provided on the table 16 to coact with wire laying head 36 for severing the wire element 51 at a predetermined point. The wire is laid in a generally inverted L-shaped path to form a vertical leg 51a and a horizontal leg 51b as shown in FIG. 2.

After the wire element 51 has been severed and the heads 35 and 36 travel along template 26 and return to their initial starting positions, the track template 26 is swung upwardly to the angular inoperative position shown in FIG. 1 and track template 27 is swung downwardly from its inoperative position to a horizontal operative position substantially parallel to the sheet 50 for laying and embedding the wire element 52 in place in plastic sheet 50. The track template 27 is a mirror image of track template 26 and the heads 35 and 36 associated therewith are operative precisely in the same manner as those associated with the track template 26 except that the former are moved in an opposite direction. When the track template 27 is raised after completion of its phase of the wire laying operation, carriage 18 is moved from the full line to the broken line position shown in FIG. 1, whereat a set of antenna wire elements 51 and 52 will be incorporated in another plastic sheet 50. A thin, flat, elongated metal connecting plate or tab 53 (FIG. 2) of a highly conductive metal, such as thin sheet copper or steel for example, is placed upon the vertical legs 51a and 51b adjacent their lower ends for subsequent securement thereto. Conventionally, the metal tab 53 has been placed in position by hand at a station remote from the wire laying station after assembly of the sandwich but prior to final lamination.

In accordance with the present invention, the tab laying apparatus 10 is operative to position the tab 53 in place in a precise orientation relative to the embedded antenna wire elements 51 and 52 as a continuous operation following the wire laying operation. The tab laying apparatus 10 is conveniently located at the front of frame 12 on carriage beam 24 in the area defined by the space between the actuating cylinders and the mounting supports for the track templates 26 and 27.

Figure 2:
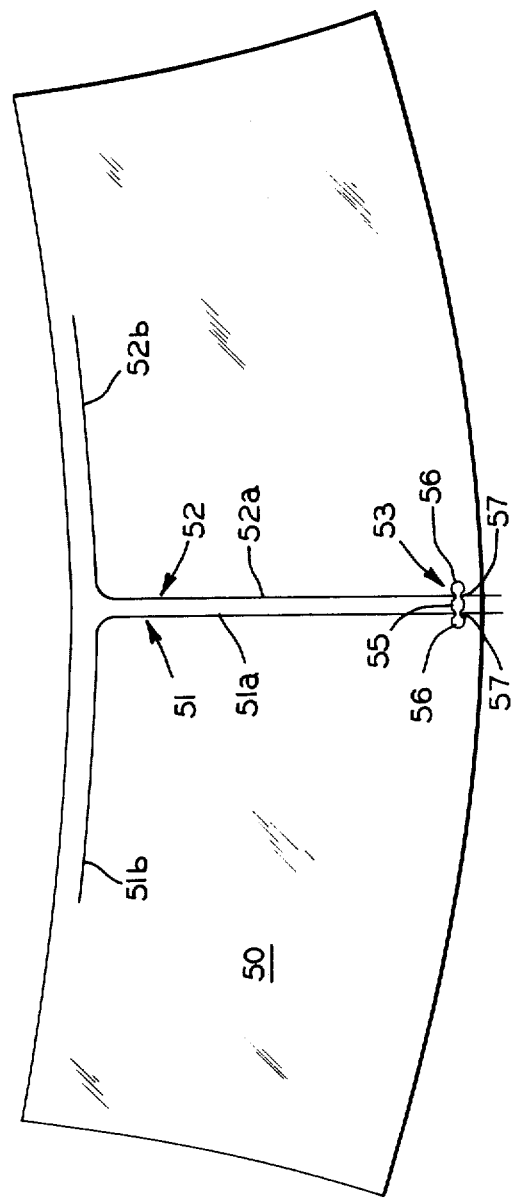
FIG. 2 is a plan view of a typical plastic interlayer for a laminated glass windshield into which antenna wires have been embedded and the connecting tab therefor placed in position by the apparatus of this invention.

While the specific configuration of tab 53 may vary, as desired, the illustrated embodiment thereof depicted in FIG. 2 comprises a substantially rectangular central portion 55 in plan, with generally semi-circular end portions 56 connected thereto by neck portions 57. The rectangular central portion 55 of the tab 53 is heat sealed to the plastic sheet 50 by the application of approximately 30 pounds pressure and heated to a temperature of about 300° F. for approximately 4 seconds by apparatus hereinafter described in detail.

Figure 3:
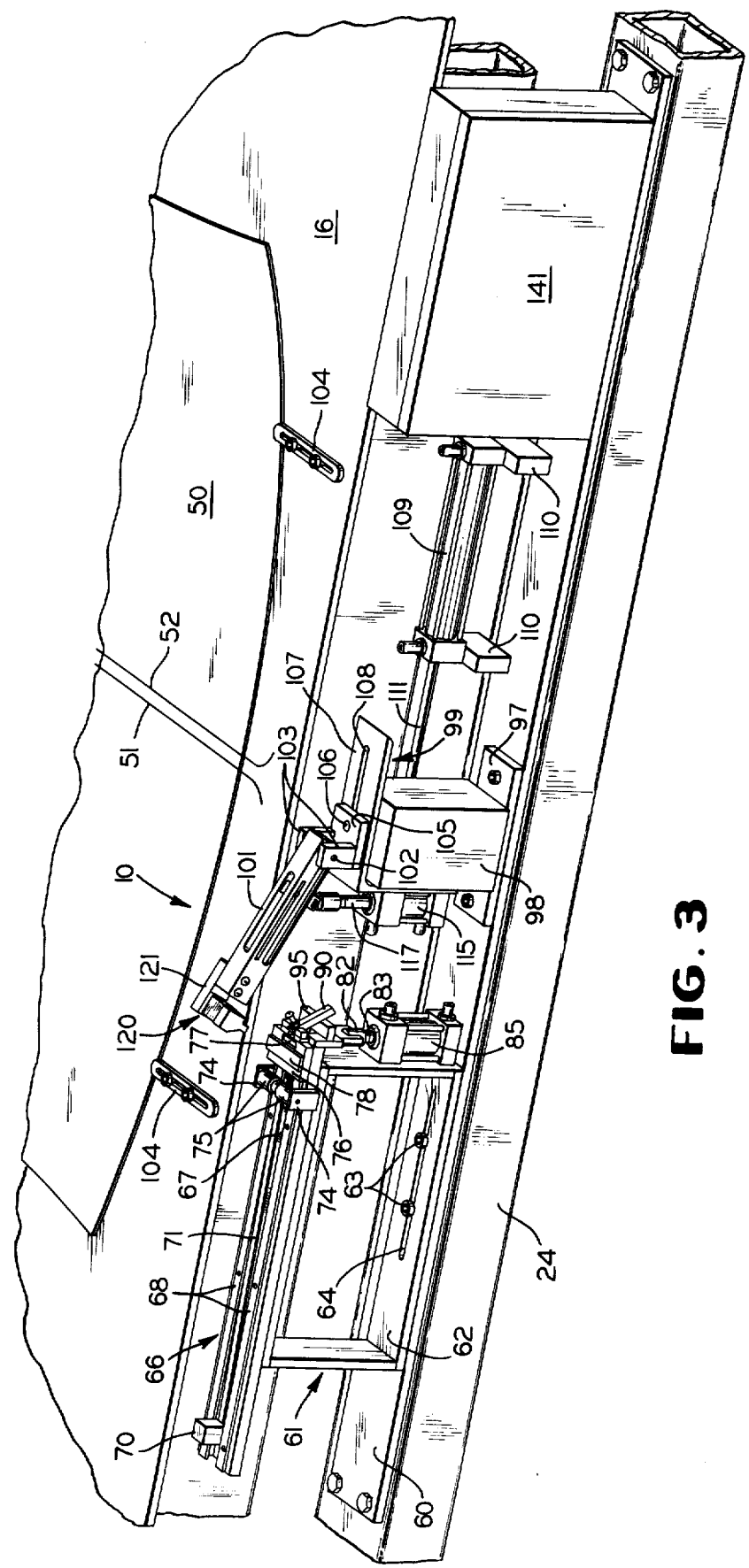
FIG. 3 is an enlarged perspective view of the tab laying apparatus, showing the transfer arm in an elevated position of rest.

As best shown in FIG. 3, the tab laying apparatus 10 comprises an elongated base 60 fixedly secured to the top wall of carriage beam 24. A magazine supporting frame 61, of generally rectangularly shaped outline in front elevation, is secured along its lower plate 62 to base 60 by means of fastening studs 63 projecting through an elongated slot 64 formed in the plate 62, enabling the frame 61 to be longitudinally adjusted relative to the base 60.

Detachably supported on the frame 61 is a cartridge or magazine 66 having a generally U-shaped configuration in cross section for receiving and storing a supply 67 of tabs 53 in an upright, abutting nested condition with the longitudinal axes of the latter extending transversely of the magazine 66. A pair of laterally spaced elongated strips 68 extend longitudinally of the magazine 66 along the top thereof and serve as covers for retaining the tabs 53 within the magazine 66. Associated with the magazine 66 is a pusher device comprising the pusher block 70 adapted to engage against the rear end of said supply 67 of tabs and urged thereagainst by a spring 71 secured at its one end to pusher block 70 and coiled at its other end about a drum 72 (FIG. 7) rigidly mounted on a shaft 73 journalled for rotation adjacent its opposite ends in a pair of support plates 74 suitably secured to the frame 61. A pair of cylindrical spacers 75 are mounted on shaft 73 on opposite sides of the drum 72 to maintain the latter centered.

Figure 7:
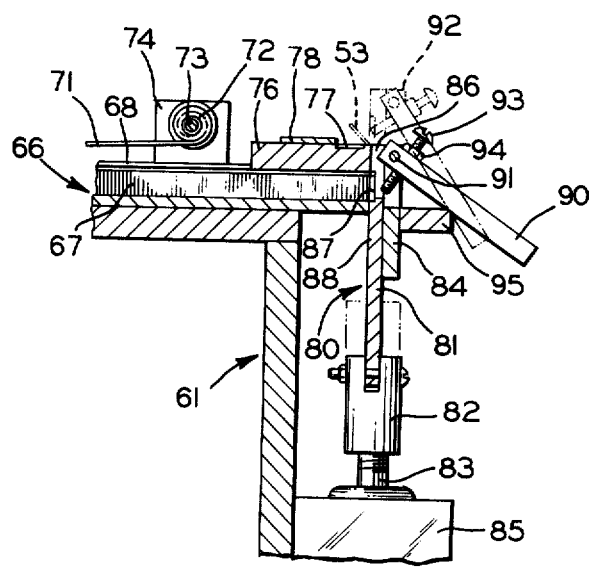
FIG. 7 is a vertical sectional view taken substantially along the line 7—7 of FIG. 6.

An article holder or pick-up support plate 76 is mounted on the frame 61 above magazine 66 adjacent the tab discharge end thereof. The upper surface of plate 76 is provided with a rectangularly shaped cavity 77, as best shown in FIGS. 4 and 7, for temporarily receiving a single tab 53 subsequently transferred to the plastic sheet 50. A stop plate 78 extends transversely across the upper surface of plate 76 behind the cavity 77 to assure proper deposition of a tab 53 therein.

Means are provided for feeding the tabs 53 singly into the cavity 77. Such means comprise an ejector 80 in the form of a rectangularly shaped plate 81 connected by means of a clevis member 82 (FIG. 6) to the piston rod 83 of an actuating cylinder 85 mounted on base 60. Cylinder 85 is operative to raise and lower the ejector plate 81 between a lower tab receiving position and an upper tab discharge position. Plate 81 is guided for vertical reciprocal movement in a guide plate 84 of generally U-shaped configuration in cross section and is provided with a central slot 86 extending downwardly from the upper edge thereof for a purpose hereinafter explained. A horizontally extending pocket 87 is formed in the front face 88 of the ejector plate 81 for receiving the leading tab 53 dispensed from the magazine 66 by the spring loaded pusher block 70. The depth of pocket 87 approximates the thickness of tab 53 to accommodate only a single tab so as to remove the same from the nested supply 67 of tabs upon vertical upward movement of the ejector plate 81.

Figure 6:
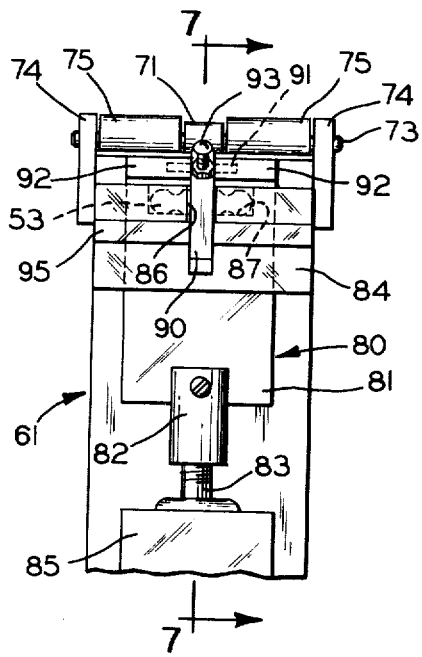
FIG. 6 is an enlarged fragmentary side elevational view of the ejector mechanism incorporated in the tab laying apparatus of this invention.

As best shown in FIGS. 6 and 7, an elongated knocker arm 90 is pivotally mounted on a transversely extending pin 91 secured at its opposite ends in opposed pivot blocks 92 connected to the ejector plate 81 for movement therewith. A tab engaging screw 93 extends through the knocker arm 90 adjacent one end thereof and is axially fixed in a selective adjusted position by means of a nut 94. Upward movement of the ejector plate 81 carries the single tab 53 positioned in pocket 87 upwardly therewith to remove the same from magazine 66 and elevate such single tab 53 to the level of the upper surface of plate 76. As the ejector plate 81 moves upwardly, carrying pivot blocks 92 upwardly therewith, the knocker arm 90 swings inwardly about its pivot 91, and as shown in phantom in FIG. 7, brings the distal end of the screw 93 into engagement against the upright tab 53 to urge the same into the cavity 77 in a horizontal position. The stop plate 78 assures proper positioning of the tab 53 in cavity 77. The knocker arm 90 is initially held in an outwardly angular position of rest as shown in full lines in FIG. 7, by means of a horizontally protruding cam 95 rigidly secured to the guide plate 84. The cam 95 controls the inward and outward swinging movement of the knocker arm 90 as the latter is raised and lowered between the full and phantom line positions shown in FIG. 7.

Means are provided for removing the tab 53 disposed in cavity 77 and transferring the same to the plastic sheet 50 for placement on the antenna wires 51 and 52 adjacent the free ends thereof. Such transfer means includes an upright pivot shaft 96 rigidly secured to a base member 97, in turn secured to the elongated base 60. Journalled on the shaft 96 for rotational movement relative thereto is a pivot block 98 having a support angle member 99 affixed thereto. A washer bearing 100 is disposed about the pivot shaft 96 and sandwiched between the pivot block 98 and base member 97 for facilitating rotational movement of the block 98.

A transfer arm 101 is mounted on the angle member 99 for pivotal movement in both a vertical plane and a horizontal plane. To this end, the rear end of the transfer arm 101 is pivotally mounted on a horizontally extending pivot pin 102 supported adjacent its opposite ends in a pair of upright brackets 103 mounted on a flat plate 105 which is secured, as by means of a fastener 106, to the horizontally extending leg 107 of angle member 99. Thus the transfer arm 101 is pivotal in a vertical plane about the pin 102 and, by its attachment through the angle member 99 to block 98, in a horizontal plane upon rotational or pivotal movement of the block 98 about its associated shaft 96.

The horizontal leg 107 of angle member 99 is formed with an elongated, axial slot 108, which receives the fastener 106 to vary the effective length of arm 101, if desired, and thereby vary the placement of the tabs 53 on sheet 50 relative to the forward edge thereof or to accommodate differently sized plastic sheets for example. In this connection, it should also be noted that the positioning of the plastic sheet supporting templates or patterns 17 relative to the front edge of the table 16 is effected by slotted guides 104. Any adjustment of the plastic sheet 50 toward or away from the front edge of the table 16 requires a corresponding axial adjustment of the arm 101.

The means for swinging the arm 101 in a horizontal plane includes a horizontally arranged actuating cylinder 109 mounted adjacent its opposite ends on a pair of supports 110 secured to the base member 60. A piston (not shown) is mounted within the cylinder 109 for reciprocal movement therein and is provided with a piston rod 111 connected by means of a clevis 112 to a clip 113 (FIGS. 4 and 5) fixedly secured to the pivot block 98. Thus, retraction and extension of the piston rod 111 effects pivotal movement of the block 98, and thereby arm 101, in a horizontal clockwise and counter-clockwise direction, respectively, as viewed in FIG. 4, between the tab pick-up and depositing positions.

The means for raising and lowering the arm 101 includes a vertically arranged actuating cylinder 115 mounted on the vertical leg 116 of angle member 99. A suitable piston (not shown) is mounted within the cylinder 115 for reciprocal movement therein and is provided with a piston rod 117 pivotally connected to the arm 101 by a connecting member 118. Reciprocal movement of the piston rod 117 raises and lowers the arm 101 between its tab pick-up and rest positions, respectively.

Figure 8:
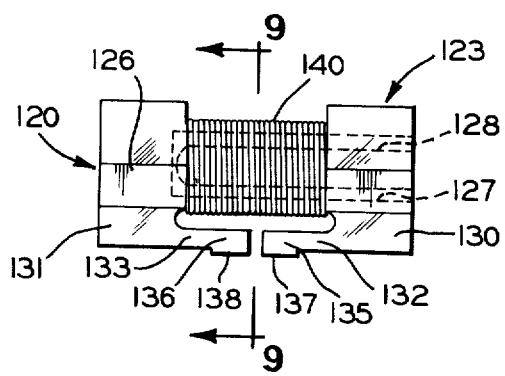
FIG. 8 is a front elevational view, on an enlarged scale, of the pick-up head incorporated in the apparatus of this invention.
Figure 9:
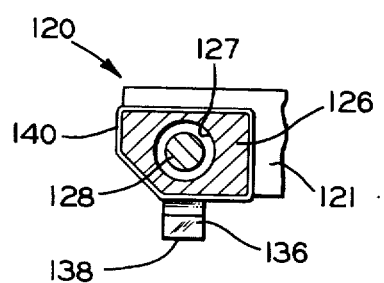
FIG. 9 is a transverse sectional view taken along the line 9—9 of FIG. 8.

Attached to the forward end of the arm 101 is a tab pick-up head 120 having a generally inverted L-shaped configuration in plan (FIG. 4) and comprising a first leg 121 secured to the arm 101 by suitable fasteners 122 and a right angularly related leg 123 having a depending tab holding tip 125. As shown in FIGS. 8 and 9, the leg 123 of pick-up head 120 comprises an elongated body 126 extending in a direction generally normal to the arm 101 and having a central bore 127 therein for receiving an electrical resistance heating element 128 for a purpose hereinafter explained. A pair of relatively narrow fingers 130 and 131 extend downwardly from the opposite ends of body 126 and have inwardly directed portions 132 and 133 parallel to, but spaced from the body 126. These portions 132 and 133 terminate in protuberances 135 and 136 slightly spaced from each other and having outer flat surfaces 137 and 138 forming the composite tip 125. The combined lengths of protuberance surfaces 137 and 138 approximate the length of the central portion 55 of tab 53 for engaging and pressing the same against the plastic sheet workpiece 50.

The body 126 of pick-up head 120 is provided with a central portion of reduced thickness about which an electrical coil 140 is wrapped, the turns thereof passing through the space defined between body 126 and finger portions 132 and 133. The coil 140, as well as the heating element 128, is connected to a suitable source of electric power (not shown). Energization of the coil 140 induces a magnetic force in protuberances 135 and 136 to attract and hold the tab 53 thereto during the tab pick-up and transfer phase.

The operation of the tab laying apparatus 10 is initiated after the first antenna wire element 51 has been completely laid and while the second antenna wire element 52 is being laid. As the wire laying head 36 advances rearwardly along its path of travel away from the front edge of sheet 50 in laying the forward portion of the vertical leg 52a sufficiently to preclude interference with the movement of arm 101 and head 120 when in the tab depositing position over sheet 50, it engages a limit switch (not shown) to complete an electrical control circuit located in a housing or box 141 mounted on the base 60 and connected to a suitable source of electrical power, also not shown.

Assuming that a tab 53 is positioned in the cavity 77 of pick-up plate 76 and the arm 101 is in its elevated rest position as shown in phantom in FIG. 5, and with heating element 128 and coil 140 energized, cylinder 115 is actuated in response to the energization of the control circuit to retract piston rod 117 and lower the arm 101 and pick-up head 120. The protuberances 135 and 136 forming the composite tip 125 of head 120 engage the central portion 55 of tab 53 and hold the same thereto by the magnetic force induced therein through the energization of coil 140. After the arm 101 is elevated by the extension of piston rod 117 to lift the tab 53 from within cavity 77, cylinder 109 is actuated to retract the piston rod 111 and, by means of the clevis and plate connection, rotate the block 98 and swing the arm 101 90° in a clockwise direction, as viewed in FIG. 4, thus bringing the tab 53 in position above the plastic sheet 50. The cylinder 115 is then actuated to retract the piston rod 117 and lower the arm 101 for placing the tab 53 on the antenna wire elements 51 and 52 embedded in plastic sheet 50. The arm 101 remains in its lower position for a predetermined time, as dictated by a timer in control circuit box 141, transmitting heat and pressure to the central portion 55 of tab 53. The heat thus conducted through tab portion 55 softens the plastic sheet 50 therebeneath in the area of such portion 55 to effect a bond therebetween. After the aforementioned predetermined time, in which the adhesive force between the tab central portion 55 and plastic sheet 50 overcomes the magnetic force induced in tip 125, arm 101 is raised by means of the cylinder 115 and then returned to its initial rest position by the extension of the piston rod 111 through actuation of the cylinder 109.

An arm 101 descends to place tab 53 on the antenna wire elements 51 and 52, cylinder 85 is actuated to raise ejector plate 81 for removing a single fresh tab 53 from the supply of such tabs and placing the same, in conjunction with the rocker arm 90, in the cavity 77 of pick-up plate 76 in readiness for the next cycle of operation. When arm 101 is raised from its tab depositing position over the plastic sheet 50 and prior to its return to the rest position over plate 76, cylinder 85 is actuated to lower ejector plate 81. Accordingly, when the arm 101 is returned to such rest position above the plate 76, a tab 53 is properly positioned in cavity 77 for the next succeeding tab pick-up operation.

Actuation of the ejector cylinder 85, the block rotating cylinder 109 and the arm lifting cylinder 115 is effected by conventional fluid control valves properly sequenced for operation preferably by an electrical timer forming a part of the electric control circuitry. Since such timing arrangements are known and, per se, form no part of the present invention, no further amplification or description is believed necessary. Of course, in lieu of an electrical timing arrangement, activation of the fluid control valves for the various cylinders to attain the foregoing sequence of operations can be effected by conventional limit switches which are operated when predetermined movements of the movable parts occur. Each of the switches triggers the subsequent stage of operation of the control valves and consequent activation of the several cylinders sequentially.

From the foregoing, it is apparent that the objects of this invention have been fully accomplished. As a result of this invention, a tab laying apparatus is provided in combination with a wire laying apparatus for removing a single wire connecting plate or tab 53 from the supply of such tabs, transferring the same to the area of the workpiece, and then precisely depositing the tab 53 in position on a pair of antenna wires previously laid and bonding the former to the plastic sheet 50 for subsequent attachment to the antenna wire elements.

It is to be understood that the form of the invention herewith shown and described is to be taken as a preferred embodiment of the same, and that various changes in the shape, size and arrangement of parts may be resorted to without departing from the spirit of the invention.

We claim:

1. Apparatus for producing interlayers for antenna-type windshields comprising: a frame having a table thereon, a carriage mounted on said frame for reciprocable movement relative to said table, means on said carriage for applying and embedding antenna wire elements in a plastic sheet supported on said table, and means mounted on said carriage for laying a connecting tab on portions of said wire elements embedded in said plastic sheet in a predetermined orientation relative to said wire portions for subsequent securement thereto.

2. Apparatus according to claim 1, wherein said tab laying means includes an auxiliary frame mounted on said carriage, a tab supporting plate mounted on said auxiliary frame, means for feeding a single tab from a supply of such tabs to said support plate, and means for transferring said single tab from said support plate onto said wire element portions.

3. Apparatus according to claim 2, wherein said tab supporting plate is provided with a cavity for receiving a tab and a stop carried by said plate assuring deposition of said tab in said cavity.

4. Apparatus according to claim 2, wherein said feeding means comprises a reciprocable member provided with a pocket for receiving the leading tab of said supply of tabs, and means for moving said reciprocable member vertically upwardly to remove said leading tab from said supply of tabs and deposit the same on said supporting plate.

5. Apparatus according to claim 4, including a magazine mounted on said carriage containing said supply of tabs, and means for urging said supply of tabs toward said reciprocable member.

6. Apparatus according to claim 2, wherein said transfer means comprises a support mounted on said carriage for rotatable movement about a first axis, an arm carried by said support for rotatable movement therewith, and means mounting said arm on said rotatable support for pivotal movement relative thereto about a second axis lying in a plane normal to the plane of said first axis.

7. Apparatus according to claim 4, together with means mounted on said reciprocable member for displacing said tab therefrom upon predetermined upward movement thereof.

8. Apparatus according to claim 7, wherein said tab displacing means comprises a rocker arm mounted adjacent the upper end of said reciprocable member for free pivotal movement relative thereto, and an adjustable element projecting through said rocker arm engagable with said tab.

9. Apparatus according to claim 7, including a cam mounted on said auxiliary frame for controlling pivotal movement of said rocker arm during vertical displacement of said reciprocable member.

10. Apparatus according to claim 6, including means for swinging said arm about said second axis between a lower tab pick-up position and an upper position of rest.

11. Apparatus according to claim 6, wherein said transfer means includes a pick-up head mounted adjacent one end of said transfer arm and provided with magnetic means for removing a tab from said supporting plate and holding the same thereto.

12. Apparatus according to claim 11, including a heating element in said pick-up head applying heat to said tab for bonding the latter to said plastic sheet.

13. Apparatus according to claim 1, wherein said tab laying means includes means for bonding said connecting tab to said plastic sheet adjacent said antenna wire portions.

14. Apparatus according to claim 1, wherein said tab laying means includes means for heating said connecting tab to effect a bond between said tab and said plastic sheet adjacent said antenna wire portions.

* * * * *